(12) United States Patent
Abe et al.

(10) Patent No.: US 6,965,723 B1
(45) Date of Patent: Nov. 15, 2005

(54) NON-LINEAR VIDEO EDIT SYSTEM

(75) Inventors: Koichi Abe, Tokyo (JP); Yasushi Okamoto, Tokyo (JP); Koji Matsuura, Kanagawa (JP); Shogo Tsubouchi, Kanagawa (JP)

(73) Assignee: Grass Valley Group, Inc., Nevada City, CA (US)

( * ) Notice: Subject to any disclaimer, the term of this patent is extended or adjusted under 35 U.S.C. 154(b) by 0 days.

(21) Appl. No.: 09/570,168

(22) Filed: May 11, 2000

Related U.S. Application Data

(63) Continuation-in-part of application No. PCT/JP98/05067, filed on Nov. 11, 1998.

(30) Foreign Application Priority Data

Nov. 11, 1997 (JP) .............................................. 9-325346

(51) Int. Cl.$^7$ ......................... G11B 27/00; G11B 27/02; G06T 11/40
(52) U.S. Cl. ........................... 386/55; 386/52; 386/124; 386/125
(58) Field of Search ............................. 386/52, 55, 124, 386/4, 125, 64; 345/327, 552; 360/13; 369/83

(56) References Cited

U.S. PATENT DOCUMENTS 6,052,508 A * 4/2000 Mincy et al. .................. 386/96

FOREIGN PATENT DOCUMENTS

| JP | 7-334971 | 12/1995 |
| JP | 9-130725 | 5/1997 |
| JP | 9-154099 | 6/1997 |
| JP | 10-164496 | 6/1998 |
| JP | 10-164497 | 6/1998 |

* cited by examiner

*Primary Examiner*—Chris Kelley
*Assistant Examiner*—Jamie Vent
(74) *Attorney, Agent, or Firm*—Joseph S. Tripoli; Joseph J. Laks; Robert B. Levy

(57) ABSTRACT

A non-linear video edit system has first, second and third play modes which are selectable at time of playing a video for an edit. In the first play mode (EP TRIM), it plays a first cut scene (scene A) before an edit point and plays a second cut scene (scene B) after the edit point according to a play list. In the second play mode (PREV TRIM), it successively plays the first cut scene (scene A) before and after the edit point. In the third play mode (NEXT TRIM), it successively plays the second cut scene (scene B) before and after the edit point. These play modes allows to change the play speed in an arbitrary direction by a dial, and to switch the play mode with one touch of the corresponding three buttons with aligning current positions.

4 Claims, 13 Drawing Sheets

PLAY LIST 80

| NO. | CASSETTE NAME | SCENE NAME | IN | OUT | DURATION | SPEED | V A1 A2 A3 A4 |
|---|---|---|---|---|---|---|---|
| 1 | CASSETTE1 | SCENE1 | 00:01:30:00 | 00:02:50:00 | 00:01:20:00 | 100% | |
| 2 | CASSETTE1 | SCENE2 | 00:03:15:00 | 00:03:55:00 | 00:00:40:00 | 100% | |
| 3 | CASSETTE1 | SCENE3 | • • • | • • • | • • • | 50% | |
| 4 | CASSETTE3 | SCENE8 | • • • | • • • | • • • | 100% | |
| • • • | • • • | • • • | • • • | • • • | • • • | • • • | |

| CASSETTE NAME | SCENE NAME | IN | OUT | |
|---|---|---|---|---|
| CASSETTE1 | SCENE A | AD1 | AD2 | |
| CASSETTE1 | SCENE B | AD3 | AD4 | |
| | | | | |

(A)

(B) EP TRIM (C) PREV TRIM (D) NEXT TRIM

FIG. 12

NON-LINEAR VIDEO EDIT SYSTEM

CROSS-REFERENCE TO RELATED APPLICATION

This is a continuation-in-part of International Application No. PCT/JP98/05067 filed Nov. 11, 1998, the entire disclosure of which is hereby incorporated by reference herein for all purposes. Certain material in this specification is also disclosed in co-pending patent applications Ser. Nos. 09/570,167 and 09/570,169 the entire disclosure of each of which is hereby incorporated by reference herein for all purposes.

TECHNICAL FIELD

The present invention relates to a video edit system used in TV broadcast, more particularly to a non-linear video edit system using a digital data recorder that features random access and nonvolatile.

BACKGROUND ART

The videocassette recorder (VCR) has been used as a video edit system for a long time. The VCR uses a magnetic tape of sequential access as a recording medium so that in order to play a scene soon after it has been after recorded, it is necessary to wait for the tape to rewind. This prevents quick response. The sequential access and the slow record and play speeds also prevent the quick edit of the already recorded video.

On the other hand, as video compression and decompression technologies have developed, a non-linear video edit system using a recording medium that features fast and random access, such as a magnetic disk, or hard disk drive, has recently begun to be used.

The non-linear video edit system has an edit function called a time line which provides a cut edit by quickly cutting out and combining arbitrary scenes of the video data that has previously been digitized and stored into the disk from external VCRs or video lines. In this process, the cutting out of scenes does not process copies of the video data, but acquires address information identifying the scenes, that is, the start and end position information that points to the locations of the scenes within the video data on the hard disk drive. In the play of the edit result, the non-linear video edit system refers to the scene ID information for reading the corresponding video data contents from the disk to play it. Such video data of the cut scenes, sequentially aligned on the time line, is called a package. This is a very smart and easy way to carry out a cut edit on the video data that has been previously stored into the disk.

In the cut edit, it may be necessary to change the start position (IN point) or the end position (OUT point) of a scene in the package once already created. In this case, since the scene in the package has been cut from a longer original scene, the real video data of the longer original scene is stored in the disk. Therefore, the modification, such as extension of the out edges of the scene is realized by just changing the values in the play list.

The time line play according to the play list provides easy confirmation of the transition from a cut scene to another cut scene. But when an edit point, the border or boundary between one scene and the following scene, is moved, it is impossible for the time line play to confirm the new border regions of the respective scenes before executing the edit, and requires complicated operations to do it.

Therefore, what is desired is to provide a non-linear video edit system that uses such a random accessible recorder, and can provides a useful operation when an edit point is moved.

What is further desired is to provide a non-linear video edit system that can easily provide a view of the outside margins of a cut scene in the time line edit.

DISCLOSURE OF INVENTION

A non-linear video edit system according to the present invention has a random access storage means for storing digitized video data, a recording means for recording the video data from external into the random access storage means, means for creating a play list consisting of data indicating the start and the end positions of each of plural scenes which are cut out from the video stored in the random access storage means, a time line play means for playing the plural scenes successively according to the play list, a display means for displaying an edit point related window including data concerning adjacent first and second scenes, and an edit point being the border of both the scenes on a display, and a control means for controlling said means. Wherein the control means displays the edit point related window concerning a noticed edit point on the display according to a user instruction, provides first, second and third play modes which are user-selectable at time of playing the video for edit, plays the first cut scene before the edit point and the second cut scene after the edit point in the first mode, plays the first cut scene successively before and after the edit point in the second mode, and plays the second cut scene successively before and after the edit point in the third mode.

These three play modes provides a useful user operation to move the edit point, the border of the scenes. That is, a margin outside the cut scene can be easily seen during the time line edit. It is favorable that the play speed is variable in an arbitrary direction by a dial operation in these modes.

More specifically, when the user instructs to switch to the third play mode during the video of the first cut scene at a position before the edit point being played in the first or the second play mode, the control means switches to the video play of the outside of the second cut scene at the position corresponding to said position before the edit point on the time line, and when the user instructs to switch to the second play mode during the video of the second cut scene at a position after the edit point being played in the first or the third play mode, the control means switches to the video play of the outside of the first cut scene at the position corresponding to said position after the edit point on the time line. This allows one touch switching of the play mode according to the user by the corresponding three keys etc. with aligning the current positions. It is favorable that the play speed is variable in an arbitrary direction by the dial operation in these modes.

If the control means receives an instruction to modify the position of the edit point from the user, it updates the end position of the first cut scene and the start position of the second cut scene on the play list so that the modified new edit point to be a new border of the first and the second cut scenes. This allows to modify the start position, the end position and the length of the cut scene without recording again.

BRIEF DESCRIPTION OF DRAWINGS

FIG. 8 shows an example configuration of a play list according to an embodiment of the present invention.

FIG. 12 shows an example of an edit point trim window on a display according to an embodiment of the present invention.

BEST MODE FOR CARRYING OUT THE INVENTION

Figure 1:
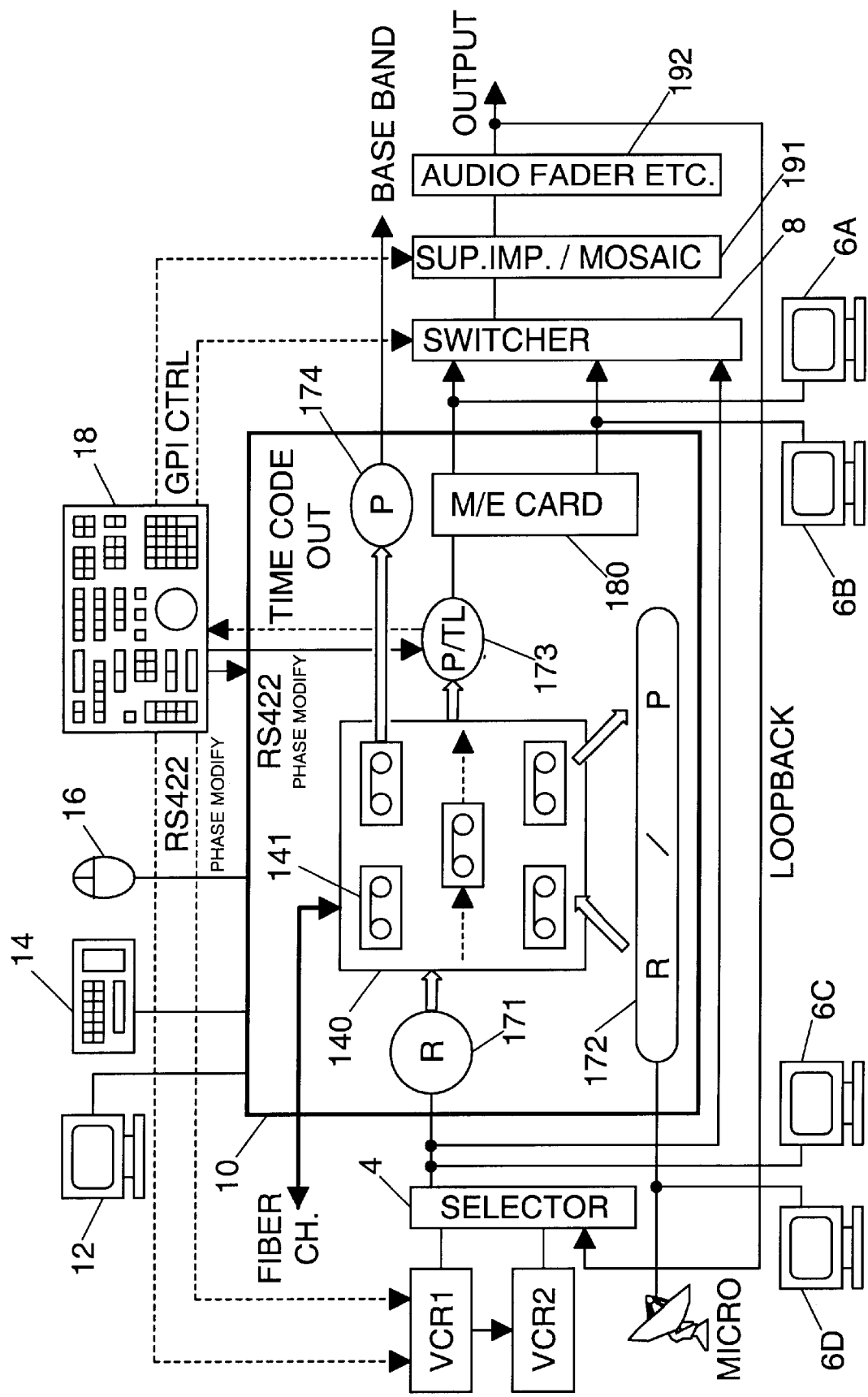
FIG. 1 shows a schematic block diagram of a video edit system according to the present invention.

Referring to the drawings, an embodiment of the present invention will be explained in detail. FIG. 1 shows a schematic overall diagram of a non-linear video edit system to which the present invention is applied. The system has a digital recording and playing apparatus 10 in the center. The digital recording and playing apparatus 10 includes a non-volatile random access recorder 140, which stores video and audio data in digital form. According to this embodiment, the random access recorder 140 may be a hard disk drive. The digital recording and playing apparatus 10 has a selector 4 in the front or input stage, to which a plurality of VCRs can be connected. Besides, it may be connected to a receiver for receiving video data by radio wave. By way of example, FIG. 1 shows a symbol representing a microwave receiver with a parabolic antenna. The selector 4 is controlled by the digital recording and playing apparatus 10. The digital recording and playing apparatus 10 has a switcher 8, a superimpose/mosaic device 191 and an audio fader 192 in the rear or output stage. The switcher 8 selectively provides two video output lines of the apparatus 10 and the output of the selector 4 to the superimpose/mosaic device 191 and the audio fader 192. The two video output lines of the digital recording and playing apparatus 10 can be displayed by monitors 6A and 6B, respectively. The video outputs of the selector 4 and the receiver can be displayed by monitors 6C and 6D, respectively. Not all monitors 6A–6D are necessary. Further, the superimpose/mosaic device 191 and the audio fader 192 are also not necessary but used in such a case as it may be desired to modify the video and the audio.

Figure 6:
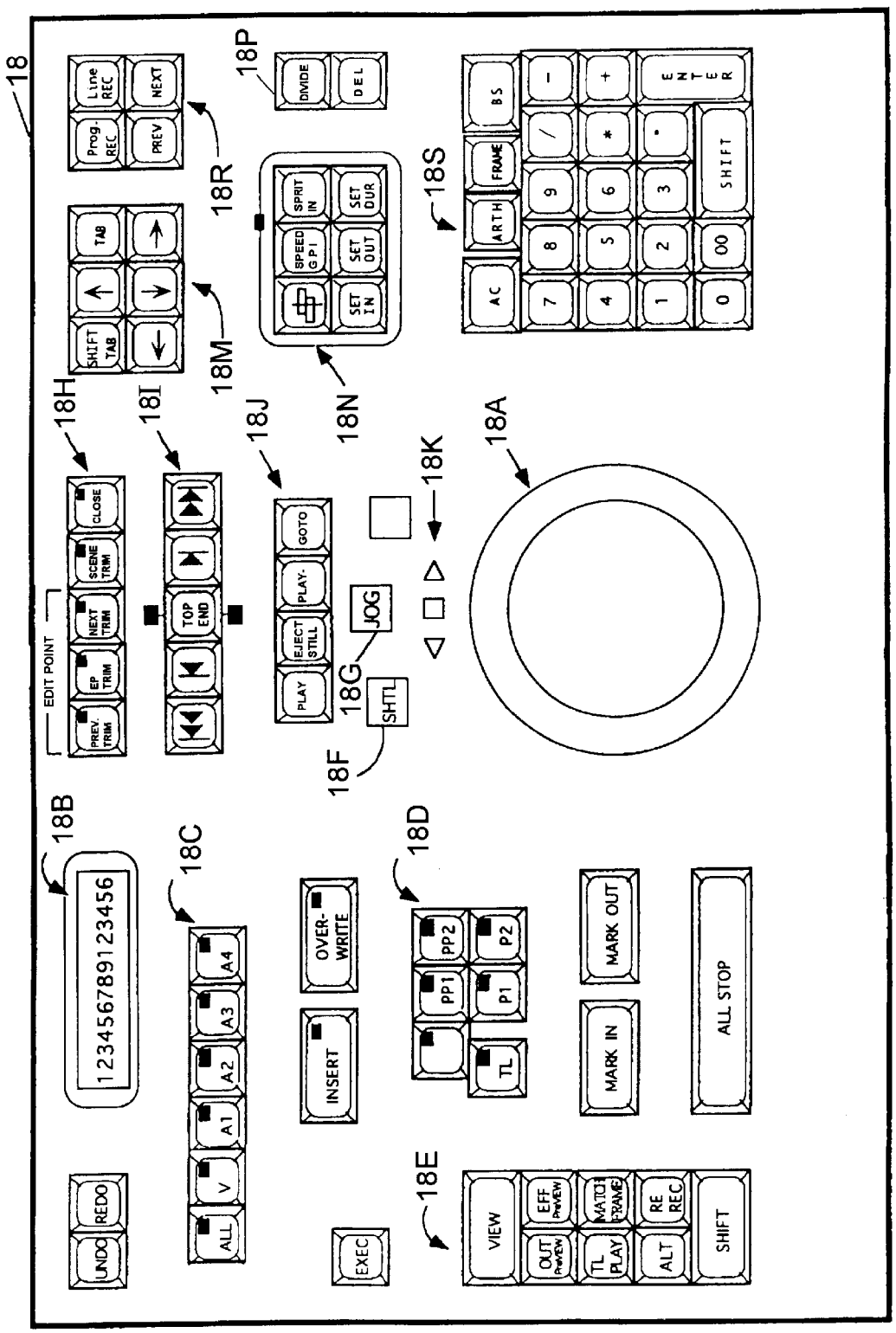
FIG. 6 shows the control panel of a operation controller used in the system of FIG. 1.

The digital recording and playing apparatus 10 is connected to a keyboard 14, a mouse 16 and a display 12. Another pointing device, such as a track-ball, may be used instead of the mouse 16. The display 12, the keyboard 14 and the mouse 16 assist the GUI (Graphical User Interface), and provide the interactive operations of record, edit and play, etc. on the display. Besides, an operation controller 18 may be connected to the digital recording and playing apparatus 10. A user can operate the digital recording and playing apparatus 10, the switcher 8, the superimpose/mosaic device 191, the audio fader 192 and an external VCR etc. by the operation controller 18 under the control of a processor, as described below. The operation controller 18 can also provide about the same GUI operations as the mouse 16 and the keyboard 14. A particular operation of the operation controller 18 is variable play speed control by a jog-dial 18A (FIG. 6). The function of the jog-dial 18A will be described blow.

The digital recording and playing apparatus 10 has resources 171–174, described below, and a mix effect (M/E) card 180 realizing the effects of wipe, dissolve etc. in addition to the random access recorder 140.

Figure 2:
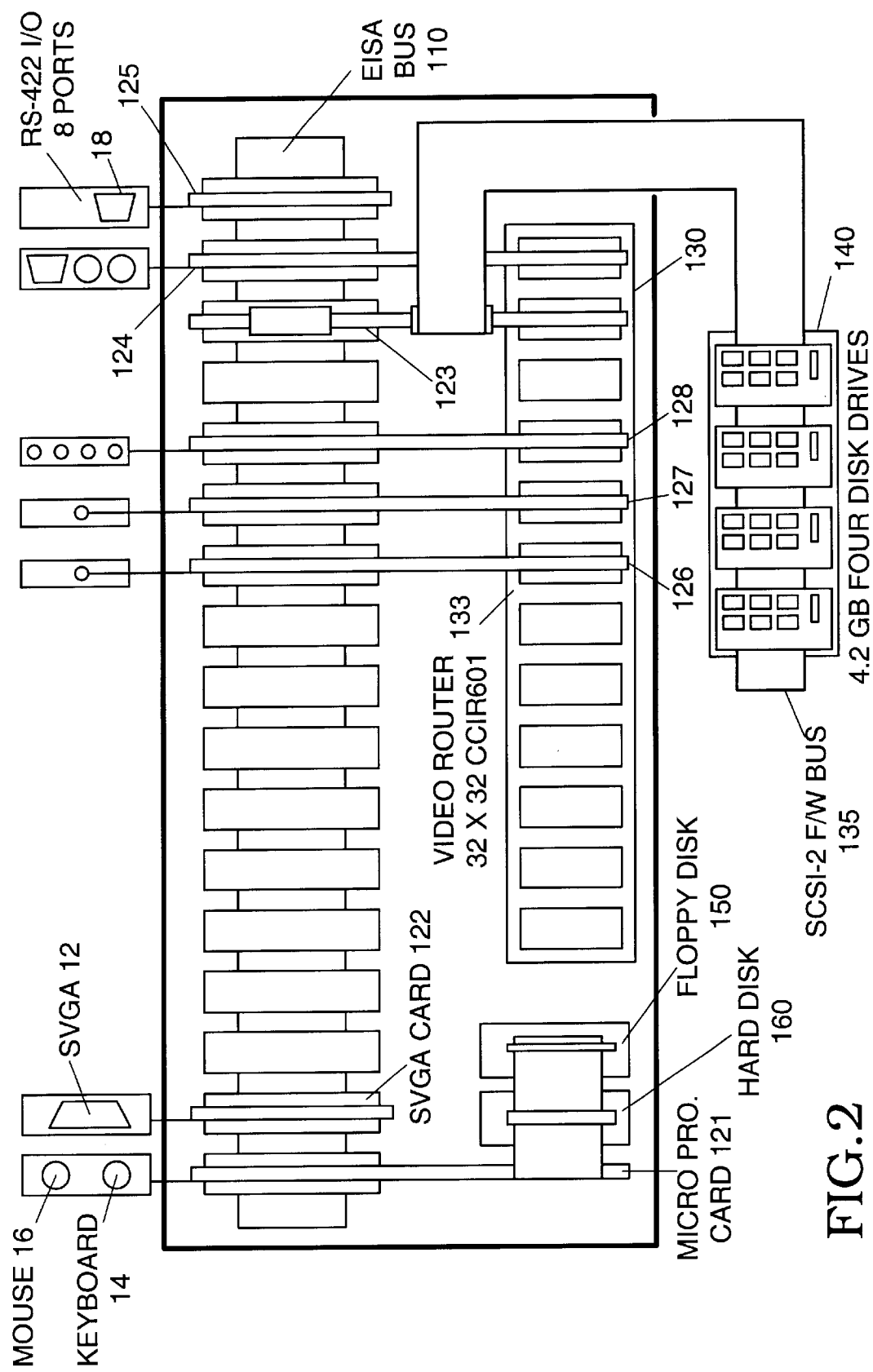
FIG. 2 shows a schematic block view of the digital recording and playing apparatus 10 in the system of FIG. 1.

FIG. 2 shows a hardware structure of the digital recording and playing apparatus 10. The digital recording and playing apparatus 10 may have an EISA bus 110 of seventeen slots and a digital video bus (CCIR601) 130 of twelve slots, in this example. A processor card 121, a display control card 122 and an RS422 interface card 125 are installed in the slots of the EISA bus 110. Besides, some of the cards may be installed in both the EISA bus 110 and the digital video bus 130. Such cards, shown in the drawings as examples, are a GEN lock reference card 124, a disk controller card 123, a video input interface card 126, a video output interface card 127 and an audio I/O (input/output) interface card 128.

The processor card 121 has a microprocessor, RAMs and an I/O interface etc. A hard disk drive 160 for the system and a floppy disk drive 150 are connected to the processor card 121, and the keyboard 14 and mouse 16 are also connected to the processor card 121. The display control card 122 has the display controller for controlling the display 12.

The video input interface card 126 receives a video signal from the external VCR, and the video output interface card 127 provides a video signal to the external monitor. The audio I/O interface card 128 has an interface for the audio input from the external VCR and for the audio output to an external speaker. FIG. 2 shows only one each of the cards 126, 127 and 128 but the system may include more than one each of these interface cards.

The digital video bus 130 includes a 32×32 video router 133 for switching the input and the output video signals. The video router 133 selects one input from the thirty-two inputs as one output from the thirty-two outputs in this example.

The disk control card 123 controls the random access recorder (video hard disk drive) 140. In this example, it controls a plurality of 4.2 G byte hard disk drives (about 16.8 G bytes in four drives in the example) via a SCSI-2 Fast/Wide bus 135.

The GEN lock reference interface card 124 is for locking an internal system clock of the non-linear video edit system to the black burst signal of the external usual NTSC or PAL. The RS422 interface card 125 provides an interface for connecting the operation controller 18.

Additional disk control cards and hard disk drives can be installed if desired. For example, FIG. 3 illustrates how the system shown in FIG. 2 can be expanded to support up to 24 disk drives.

Figure 3:
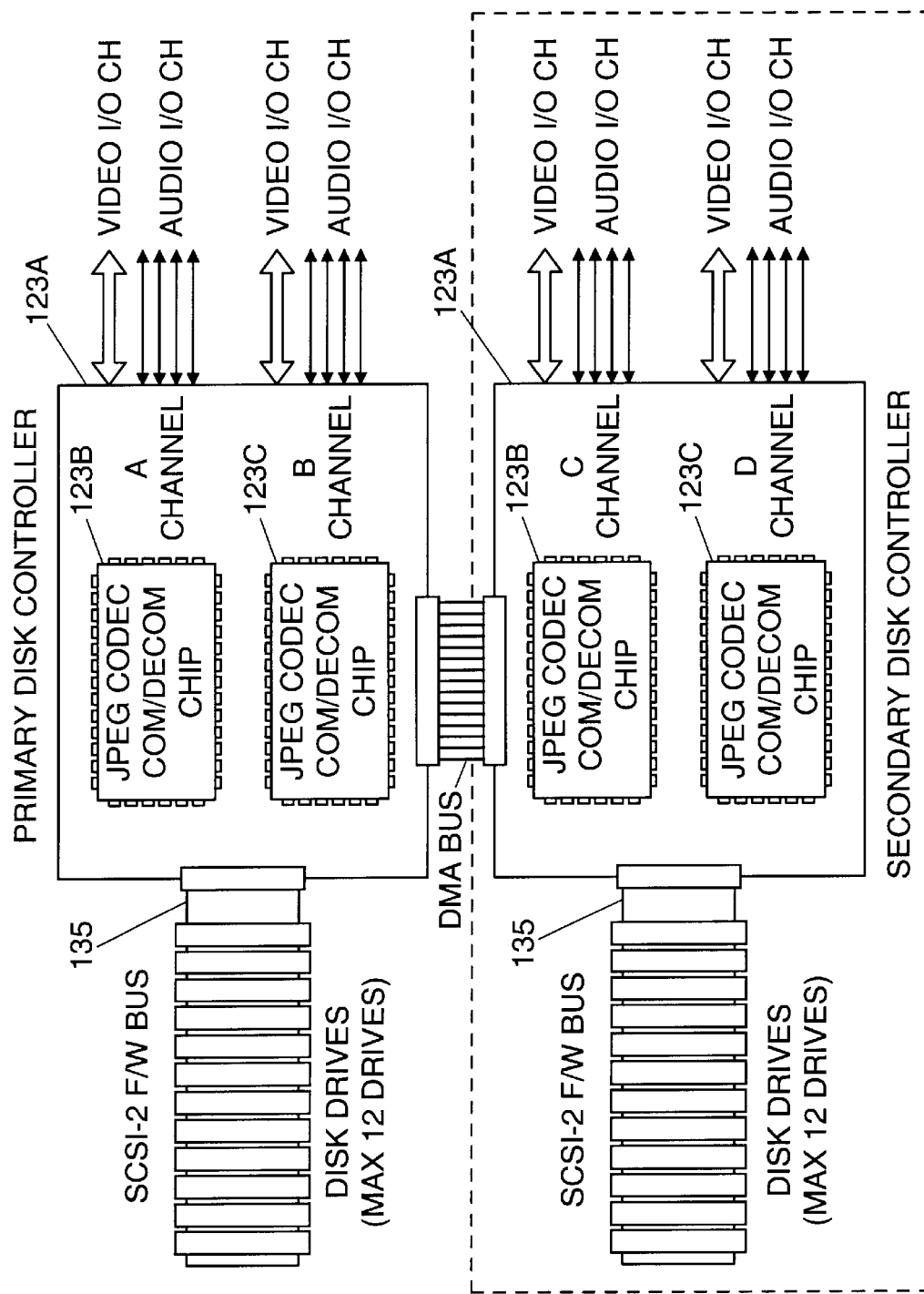
FIG. 3 shows a schematic block view of the disk controller 123a in the apparatus of FIG. 2.
Figure 4:
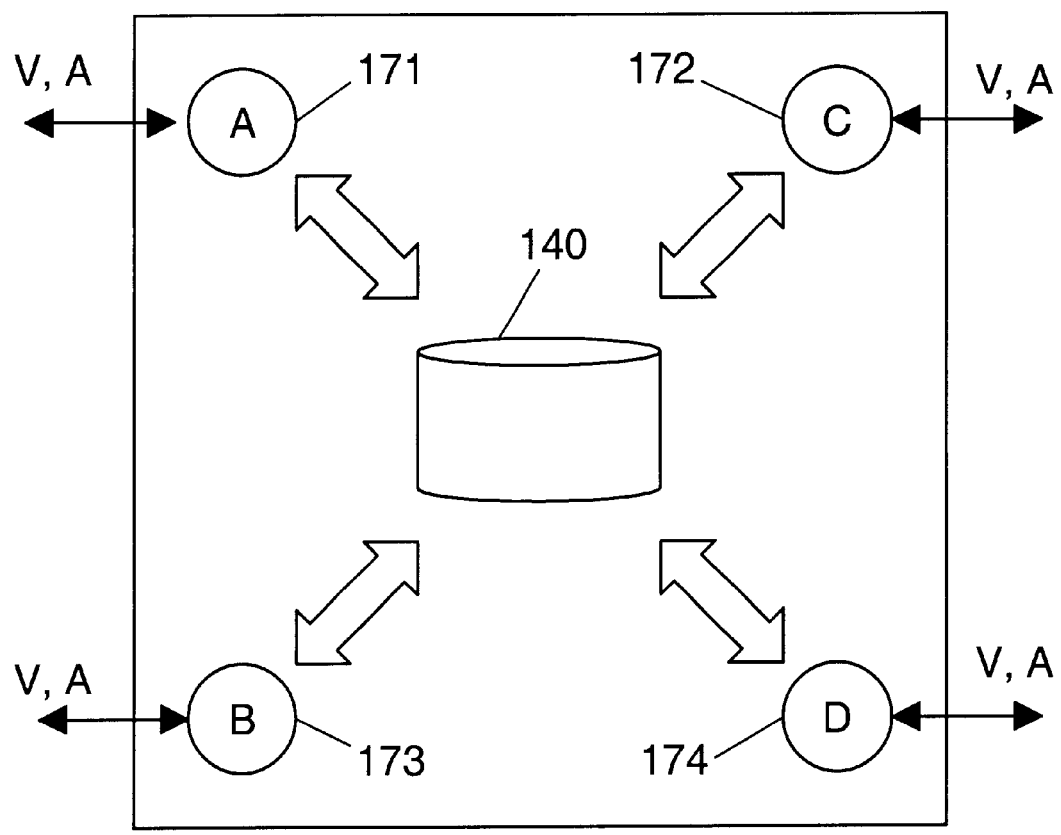
FIG. 4 shows a functional block diagram concerning the relationship between a disk and resources of working as recorders or players of the digital recording and playing apparatus in the system in FIG. 1.

FIG. 3 shows the structure of disk controllers 123A built in the disk control card 123 in the case where two disk controller cards 123 are installed. Each disk controller 123A has two JPEG (Joint Photographic Experts Group) compression/decompression chips 123B and 123C and is able to control up to twelve hard disk drives. This example uses the motion JPEG compression technology to compress and store the video into the disk for longer time recording of the video signal. Each chip has one video I/O channel and four audio I/O channels, and compresses and stores the input video and audio signals into the disk, and decompresses the compressed and stored information to output it. The present system has a plurality (four, in this example) of physical resources (JPEG compression and decompression chips) 171–174 which can work as recorders or players, respectively. These four resources correspond to A–D channels, respectively, and the number of the resources corresponds to the number of compression/decompression chips shown in FIG. 3. These resources can be allocated to different functions such as record, play or edit etc. according to the user intention. These logical video players are called, in this system, virtual recorders or virtual players (or internal players). Each resource can access the disk 140 independently, and the several resources are organized so that they execute write and read operations simultaneously to the disk 140 by well know techniques such as Striping. Then scene data, which is being written by one resource, can be read out by another resource with a delay of only a few seconds corresponding to a data buffering time to absorb a relative gap between the data write and read operations. In the example of FIG. 1, the resource 171 is exclusively used as a recorder and the resource 172 is used selectively either as a recorder or as a player. Further, the resource 173 is selectively used as a player or a time line play (or edit), and the resource 174 is exclusively used as a player. When the resource 173 operates in the time line play mode, it plays a package based on the play list, reading data from multiple virtual internal cassettes in the disk 140. When the resource 173 operates in the player mode, it plays scenes in the order that they were recorded on a virtual internal cassette, just as a VCR plays a real cassette.

The "Time Line" in this specification means a cut edit function and/or a work area thereof for combining a plurality of video scenes (and the corresponding audio scenes) on a time axis, and the product of the cut edit is called a "Play List". The package defined by the play list is played by the resource assigned to the time line (TL) but not the player. Then this resource may be called a "TL: Time Line".

Figure 5:
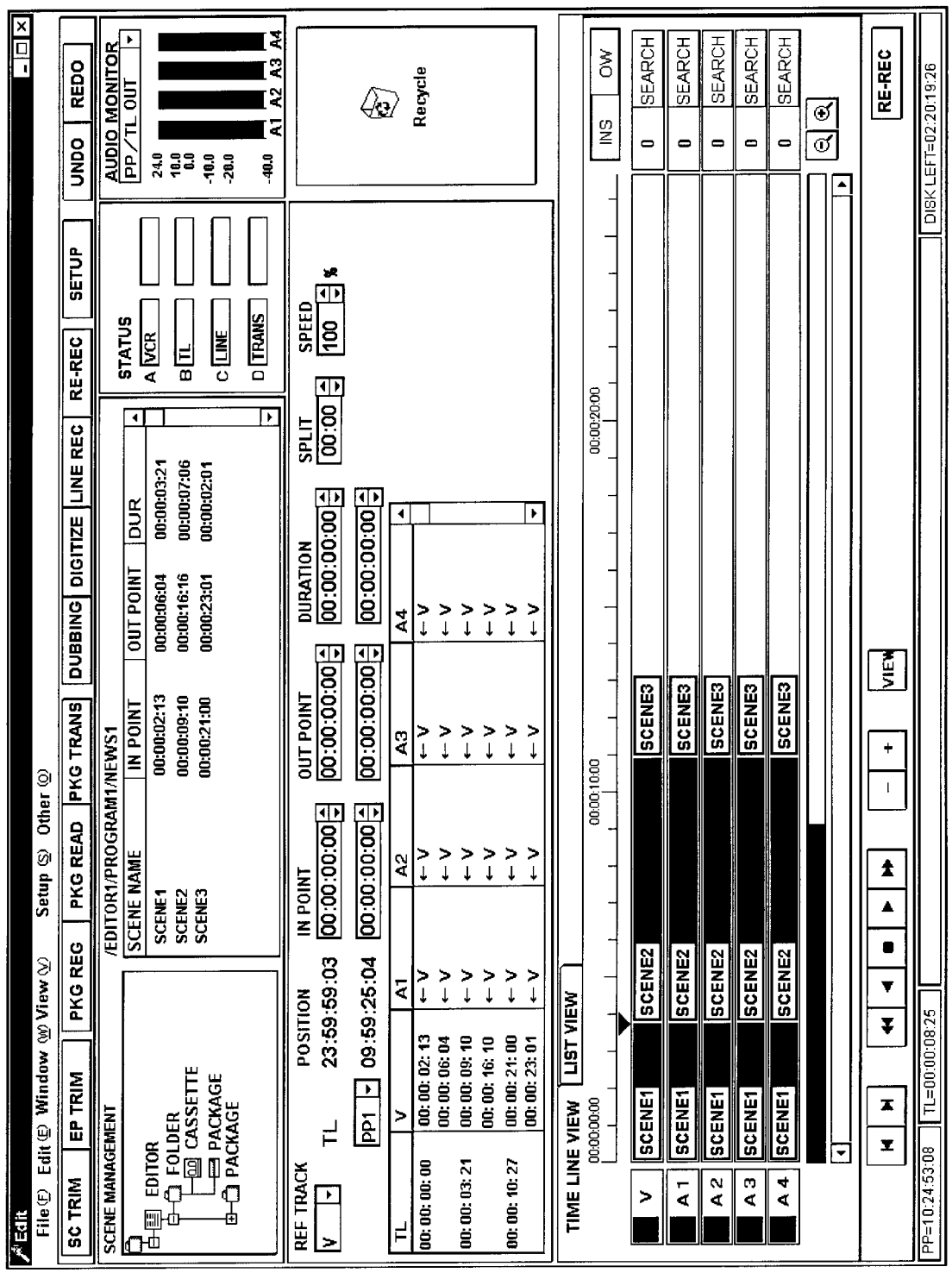
FIG. 5 shows an example view of a basic edit window, called a root window, on a display 12 according to an embodiment of the present invention.

FIG. 5 shows a screen view of a basic edit window (called "root window") on the screen of the display 12 according to an embodiment of the present invention. This screen is the default screen of the system, the image data of the frame is stored in the system disk 160, and the variable values of the data and the parameters are displayed in each area. The areas are, from the left, "Scene Management" area, "Status" area, and "Audio Monitor" area in the screen upper section, "Time Data" area in the middle section, and "Time Line" area in the lower section. The scene management area, in the screen left upper section, provides hierarchical data management for the video data (virtual video cassette, package etc.) stored in the random access storage medium. Reference to the scene management area makes it possible to provide operations of selection, move, copy, deletion etc. for a desired cassette (virtual internal cassette 141 of FIG. 1) and/or package. The right side of the scene management area is the area that provides the list view of the contents of the packages etc. selected in the scene management area.

The status area shows the current assignments to the described channels A–D, such as line, VCR, TL, transfer etc. and the statuses, such as record, play, transfer etc. In this figure, channel A is assigned to a "VCR", channel B to a "TL", channel C to a "line", and channel D to a "transfer".

The audio monitor area in the screen upper right shows the current statuses of the four audio tracks.

The time data area in the middle of the screen shows various parameters affected or controlled by the time line edit. It shows the reference track indicator, the current position of the edit object on the TL, and IN point, OUT point, duration, split and speed of the scene subject to the edit. The split generally shows a lag by which the scene cut point of the video track, which is the reference track, is shifted from that of the audio tracks. Besides, the area shows the indicator of a device as a source of the "TL" (a device PP1 is selected in the figure), and the in point, the out point and the duration of the edit object for this device.

The reference track indicator is a list box which allows the user to select any one of the tracks as the reference track. In a video edit operation the video track usually takes the key role and the user normally specifies the edit point by reference to the video material. In such case, the video track is selected as the reference track, as shown in FIG. 5, but in a suitable case another track could be selected as the reference track.

The lower portion of the time data area provides a list view of time codes on the time line of scenes constituting the package currently set to the TL and the identification information of the scenes. The left column (headed TL) in the list view shows the time codes on the time line of scenes 1, 2 and 3 illustrated in the time line area, as will be described in further detail below. The column V shows the original time codes that were generated when the video was recorded. The symbol ←V in the audio columns means the same time code as in the video column. The IN and OUT points, represented as 00:00:00:00, are in the default state, before a user edit.

There is a recycle box on the right side of the data area to throw data away.

The time line area in the lower section of the screen shows the contents of a given package in time sequential fashion, and it can mainly provide a time line edit operation. The view in the time line area is switchable between a time line (time sequential) view and a list view, which can be selected by a tab in the upper left of the time line area. The time line view is selected in the example of the figure. The time line view shows relative time from the start of the package as time codes, which have the form of hour, minute, second and field (or frame) values. It also has select buttons for the "over write" and the "insert" of the scene. The time sequential view shows one video track V and four audio tracks. Each track has segments representing the various successive scenes. Though it is not shown, it is favorable to indicate the segments that form the scene that currently receives focus by highlighting or emphasizing these segments. An inverse triangle point or cursor above the V track indicates the position of the current edit point. A bar below the A4 track indicates the proceeding status of the time line play. The scale of the horizontal axis of the time line area can be varied by using magnifying glass icons in the lower right. A scroll bar below the status bar indicates the location in the package of the portion that is displayed and the proportion of the entire package that is represented by the portion that is displayed. The lowest section of the time line area has operation buttons (<<, <, II, >, >>) for play etc., and buttons (I<, >I) for moving the focus (e.g. jump to scene start). Besides, it also has buttons (−, +) for a single frame step function and a button for a view instruction (second instruction), which is described below.

At the left end of the tracks in the time line area are buttons V, A1, A2, A3 and A4 that can be pressed to select a track to receive an edit operation. If a button is not pressed, the corresponding track cannot normally accept the edit operation.

The right end of the time line area has indicators of blank scene numbers of each track, and buttons for instructing blank scene search. It also has select buttons for selecting from insert and overwrite operations in the scene edit. The upper left of the root window frame contains a menu bar including pull-down menu items such as "File" and "Edit" etc. The "File" menu provides operations such as new file creation, save and rename etc. Below that, there is a tool bar having various operation buttons. The functions of these buttons are not pertinent to the invention described herein.

FIG. 6 shows the control panel of an example of the operation controller 18 used in the embodiment according to the present invention.

An area 18B at the upper left of the control panel is a liquid crystal display part for displaying values such as the time code, which a user can input by ten keys 18S in the lower right. The key group 18C below the liquid crystal display is for selecting the track subjected to the operation in the time line area of FIG. 5. The "EXEC" key is for instructing record execution in the time line edit described below. "INSERT" and "OVERWRITE" keys have the same functions as the insert and overwrite buttons in the time line area of FIG. 5. A key group 18D contains device select keys for selecting operation objects, in which "TL" is for the time line, "P1" and "P2" are for the two external VCRs, and "PP1" and "PP2" are for the two internal virtual players 172 and 173. A key group 18E includes a "VIEW" key having the same function as the VIEW key shown in FIG. 5, of which the function is described below. The "MARK IN" and "MARK OUT" keys below the key group 18D are used to inform the system of desired IN and OUT points while the user watches the monitor. The "ALL STOP" key is for instructing interruption of operation or working.

A key group 18H including a "PREV. TRIM", "EP TRIM", "NEXT TRIM", "SCENE TRIM" and "CLOSE" at the upper center of the operation controller 18 contains edit keys used in the time line edit. The key group 18I contains keys for selecting a cassette or cueing up to an edit point or a scene. The key group 18J contains keys for double speed play, still picture play and search by time code.

The dial 18A for variable speed play is in the lower center of the operation controller 18. The keys 18F and 18G above the dial 18A are for instructing the dial 18A to work as a shuttle dial or a jog dial. The shuttle dial controls the play speed according to the rotation angle so that increasing the angle of rotation makes the play speed increase, and the zero angle makes the play still. The jog dial controls the play speed according to the rotation speed so that increasing the speed of rotation makes the play speed increase, and stopping rotation makes the play still. An indicator 18K indicates the current direction of the play. The user usually operates the dial 18A while watching the monitor connected to the output of the play.

A key group 18M in the upper right of the operation controller 18 contains operation keys for a GUI pointer (not shown) displayed on the screen such as FIG. 5. The GUI pointer moves the focus (the reversed portion) around the areas in sequence by "TAB" or "SHIFT TAB" keys, and the movement of the focus within a given area of the root window is done by the arrow keys. The "SET IN" and the "SET OUT" keys of a key group 18N are for fixing values of the IN and OUT points, respectively, when their values are input by the ten keys. Key groups 18R and 18P are not directly pertinent to the present invention and are not described herein.

Figure 7:
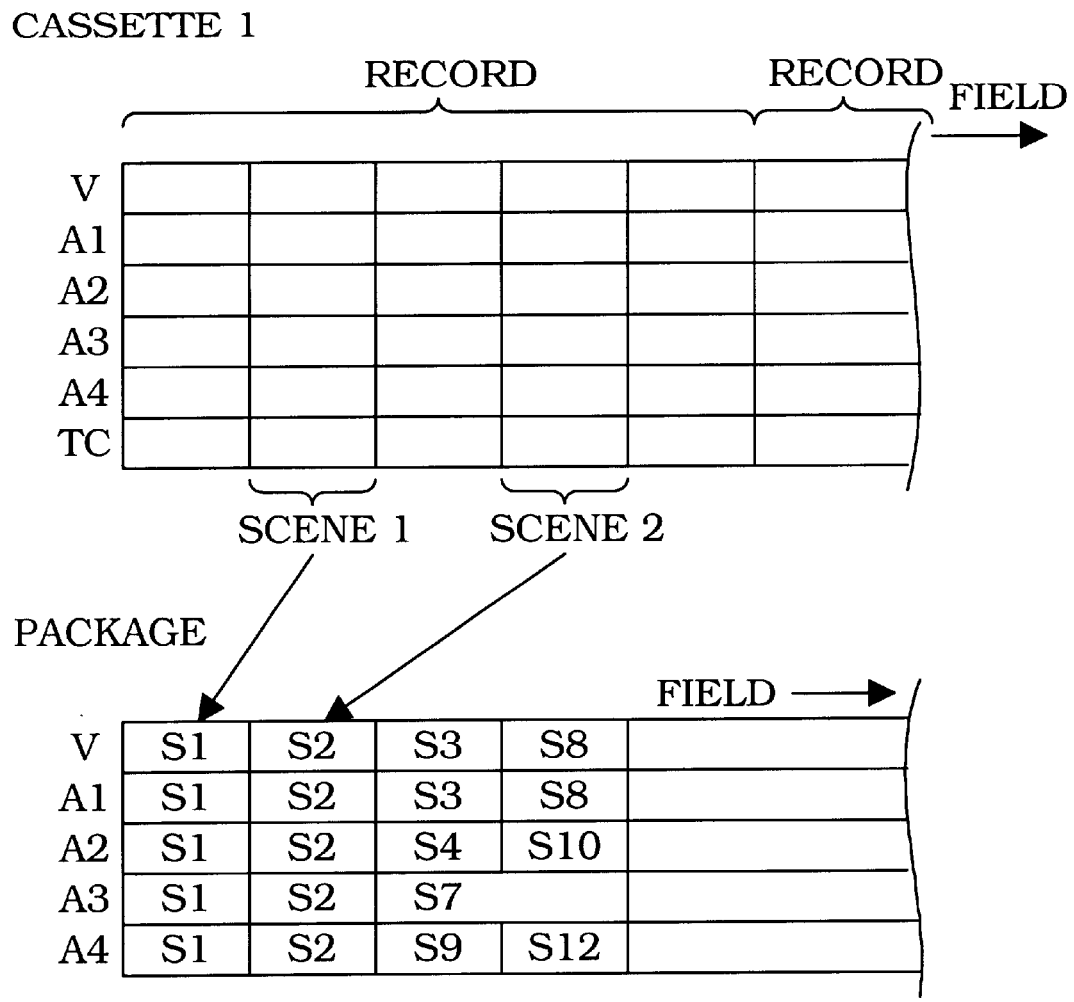
FIG. 7 shows formats of video data etc. stored in a video hard disk drive according to an embodiment of the present invention.

FIG. 7 shows a data format such as video etc. stored in the random access recorder 140 according to an embodiment of the present invention. The video data of one track, the audio data of four tracks, and the time code of one track, which are provided from the external VCR or a line input (such as the microwave receiver or a fiber optic line) etc., constitute one set, which is stored in the virtual internal cassette set (corresponding to 141 of FIG. 1). When video material is recorded by a video camera using a tape cassette, the original time code is produced by the camera and is recorded with the video on the cassette. The cassette is then removed from the camera and is loaded into the external VCR, and the original time code is read as the video is played.

In this specification, a unit of sequential video (and audio) written into the internal cassette at one time is called a "record". A portion of the record stored in the internal cassette is called a "scene." The scene is identified by information of the IN point or start point and the OUT point or end point when the time line edit is carried out. The IN and OUT points are identified by the addresses in the disk, especially, by field (or frame) number in this case. If the user designates the IN and OUT data by time code, they are converted into the corresponding field numbers.

As shown in the lower section of FIG. 7, the virtual alignment of the scene identification information on the time line in time sequential fashion provides a scene cut edit.

Scene combination created by such a cut edit leads to a package. The package, however, is not composed of a sequence of copies of video data (including the audio data) of a plurality of scenes. In fact, the package is a set of scene identification information as described above. The present specification refers to such a set of scene identification information as a "play list." The edit-completed package can be saved with a name by the "package registration". The registered package is stored in a package window (not shown), and is also confirmed in the scene management area.

FIG. 8 shows an example of the play list configuration. The play list has information of video V, and audio A1, A2, A3 and A4. Each plane defines, for each scene, a cassette name 81, a scene name 82, an IN point 83, an OUT point 84, duration (the length of the scene from the IN point to the OUT point) 85 and a play speed 86 of the internal cassettes storing the scenes. FIG. 8 shows the IN and OUT points in the form of time code (hour: minute: second: field) for simplicity, but the actual system may hold field numbers as the addresses in the disk. When the system plays the package, it refers to the play list and reads out the designated scenes from the disk in the prescribed sequence so that it operates as if it were playing a video cassette tape on which the scenes were recorded as a single sequence. In this manner a cut edit of the package is realized without carrying out operations (such as play and record) on copies of the video data etc., but by just combining the scene identification information. Therefore, it allows the quick creation and modification of the package based on the record already existing in the disk.

Figures 9, 10:
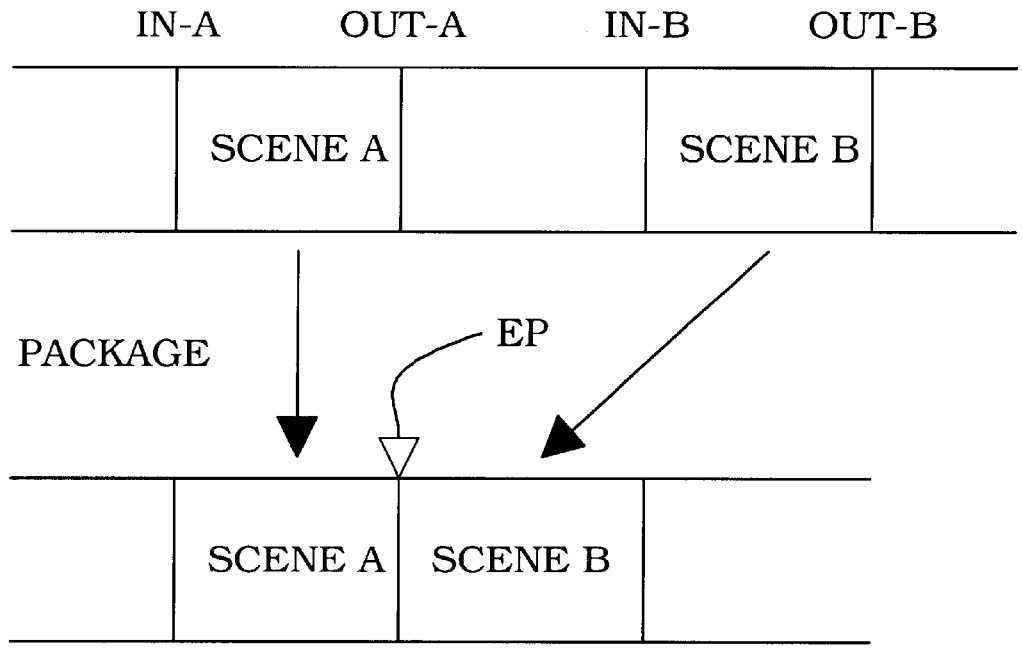
FIG. 9 describes an edit operation to produce a package from a cassette according to an embodiment of the present invention.
FIG. 10 shows a play list structure derived from the edit operation of FIG. 9.

FIG. 9 schematically shows a package created by editing a scene A and a scene B stored in a cassette which may be a real cassette or an internal virtual cassette. FIG. 10 shows part of a play list defining this package. The figure indicates that scene A is a cut scene which has the IN point at an address AD1 of cassette 1 and the OUT point at an address AD2. And scene B is a cut scene which has the IN point at an address AD3 of the cassette 1 and the OUT point at an address AD4. There is an edit point EP at the border between scene A and scene B in the described package. The edit point EP is shown within the time line area in the root window of FIG. 5 as an inverse triangle pointer on the V track. The edit point pointer is moved by the key group 18I of the operation controller 18 or the button of the low section in the root window.

Figure 11:
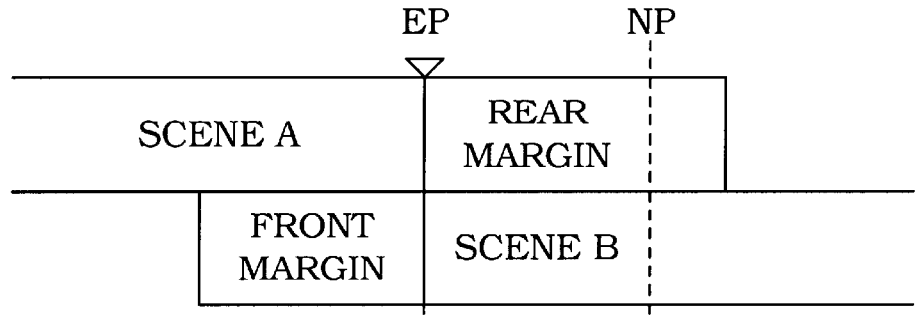
FIG. 11 shows a real data relationship of adjacent previous and later scenes in the package in A, and play outputs in cases of an EP TRIM, an PREV TRIM and a NEXT TRIM in B, C and D, respectively.
Figure 11:
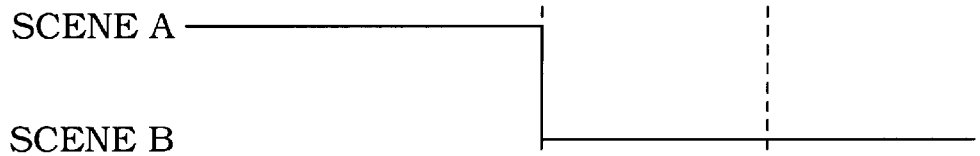
Figure 11:
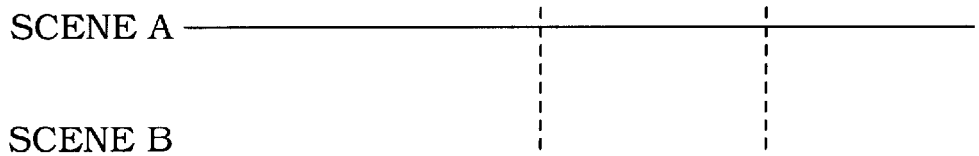
Figure 11:

The real data of the cut scene A and the cut scene B of the package shown in FIG. 9 exist in the disk, and, as shown in FIG. 11A, the video immediately following scene A is hidden as a rear margin beyond the end (i.e. the edit point) of the cut scene A. Similarly, the video immediately preceding scene B is hidden as a front margin before the beginning (i.e. the edit point) of the cut scene B. The user can see the situation using an edit point trim window shown in FIG. 12.

Figure 12:
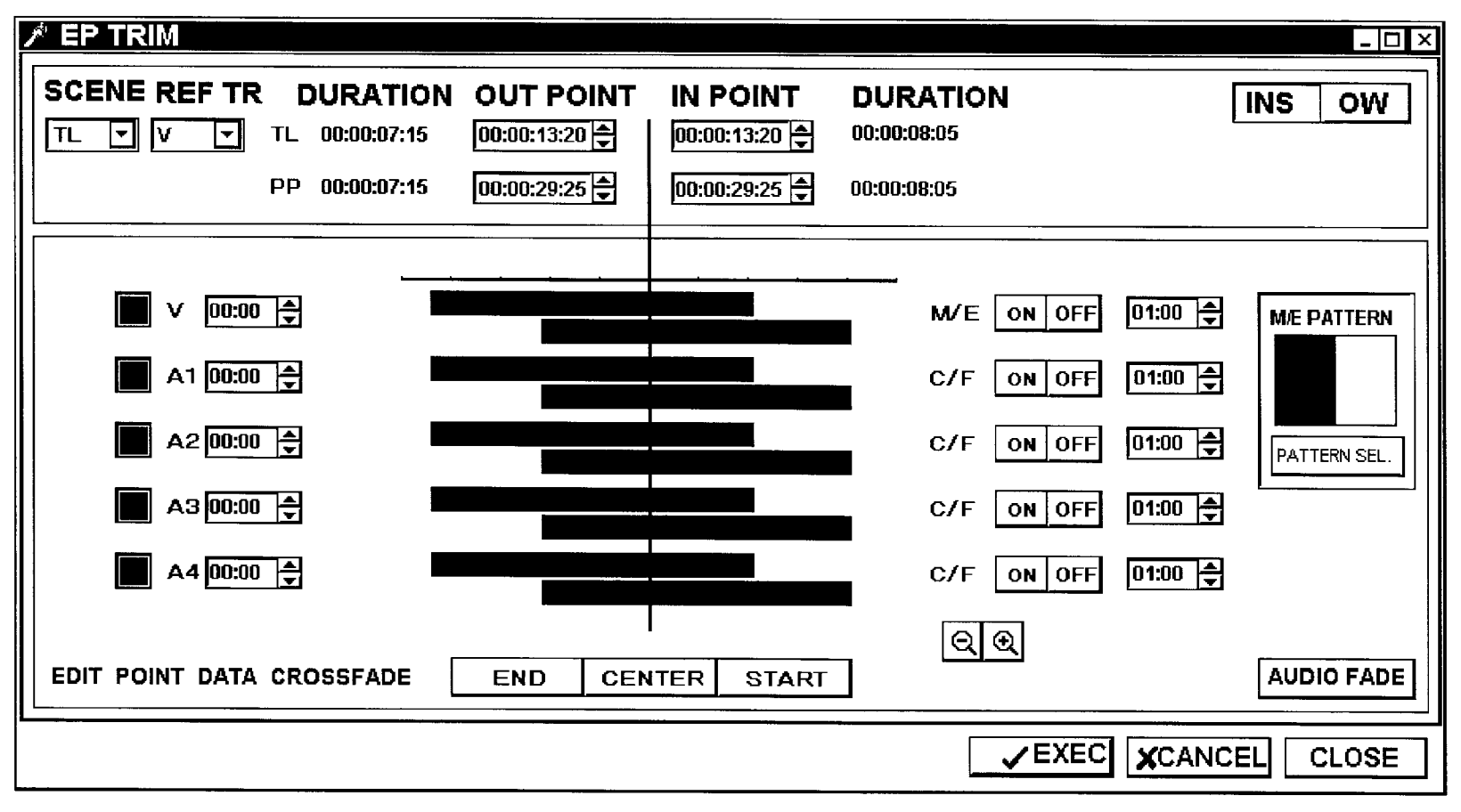

The edit point trim window of FIG. 12 is opened by the user pressing the PREV. TRIM key, the EP TRIM key or the NEXT TRIM key of the operation controller 18, or an "EP TRIM" button on the tool bar in the root window. And it is closed by pressing the CLOSE key of the operation controller 18 or a "CLOSE" button on the tool bar. The edit point trim window is an edit point related window which holds the data concerning the adjacent first and second cut scenes (also referred to as a previous scene and a later scene), and the edit point of the border of the two scenes. The window allows the user to confirm the edit point and to modify or adjust the edit point.

The edit point trim window shows the relationship between the previous scene and the later scene by bar graphs for the V track and for each of the A1–A4 tracks. One of the tracks is selected as a reference track using the REF TR list box in the edit point trim window, and the edit point trim window displays the data of the duration and the OUT point of the previous scene, and the duration and the IN point of the later scene of the reference track by the time code on the time line, and the time code of the original material loaded into the internal player (PP). The data of the OUT point of the previous scene is usually the same as that of the IN point of the later scene. The OUT point of the previous scene and the IN point of the later scene can be modified on this window. More specifically, values are input to modify the time codes, then the "EXEC" button is pressed to carry out the modification. At this time, the user can select either overwrite or insert to the other scene. In case of overwrite, the time code of the edge point of the other scene is modified, and it is not in case of the insert. The edit point can also be modified by moving a vertical line indicating the edit point in the bar graph and pressing the EXEC button. Besides, a mix effect on the V track and fades on the A1–A4 tracks can be conducted on this window. An "END" button, a "CENTER" button and a "START" button are used to designate the timing of picture switching in the mix effect (M/E). The "END" means that the mix effect finishes at the edit point, the "CENTER" means that the edit point is the center point of the mix effect, and the "START" means that the mix effect starts at the edit point. By the way, the "SPLIT" in the figure, as described above, shows the gap between the edit point of the audio track and the edit point of the video track.

If the "EP TRIM" key is pressed, the previous scene and the later scene are played successively, as the edit point is the border, based on the play list of the current selected package. For example, the scene transition around the edit point is viewed on the monitor with a variable speed play in a selected direction by pressing the jog or shuttle key 18F or 18G and operating the dial 18A rotation. Then, the scene transition is shown as FIG. 11B.

On the other hand, if the "PREV TRIM" key is pressed, only the previous scene is played, as shown in FIG. 11C, even if the play position is changed around the edit point by operating the dial 18A rotation. On the contrary, if the "NEXT TRIM" key is pressed, only the later scene is played even around the edit point as shown in FIG. 11D.

If the user wants to extend the rear end of scene A backward a little, it is necessary to confirm the video of the rear margin of scene A. Therefore, the present embodiment can provide confirmation of the rear margin of scene A after the current edit point EP on the monitor by only pressing the "PREV TRIM" key. In order to confirm the rear margin of scene A before the present invention, it was necessary to carry out complicated steps such as change the play device from the time line to the internal player PP, select scene A in the scene management area of the root window, search for the OUT point of scene A by the time code (OUT of PP in FIG. 12) of the original material of the OUT point of scene A, and view the rear margin after the OUT point by operating the dial 18A. After that, if the user should try to shift the edit point to a new edit point NP within the margin, the user might want to know-how the later scene (scene B) video is at the position. At this time, the user can view the concerned position of scene B by pressing the "EP TRIM" key or "NEXT TRIM" key. Before the present invention, it was necessary to select scene B to watch it by the internal player PP. Further, it was required to calculate the difference from the edit point on scene A to the new edit point NP to know the position on scene B corresponding to the new edit point NP. In addition, it was required to search the time code of adding the difference to the time code of the edit point EP on the time line and, at last, view the video of scene B at the new edit point NP.

The "NEXT TRIM" key allows viewing of the front margin of the later scene.

By the way, the same operations of pressing the "PREV TRIM", the "EP TRIM" and the "NEXT TRIM" keys can be designated by the input area of the upper left section in the edit point trim window.

As described above, the present invention provides the user with the quick confirmation of the outside (margin) portion of the other scene, which overlaps and corresponds to the current play position of one scene, by just the key instruction. After the confirmation, if the new edit point is not desirable, the new edit point is shifted again and just pressing the predetermined button allows the immediate confirmation of the scene transition.

Figure 13:
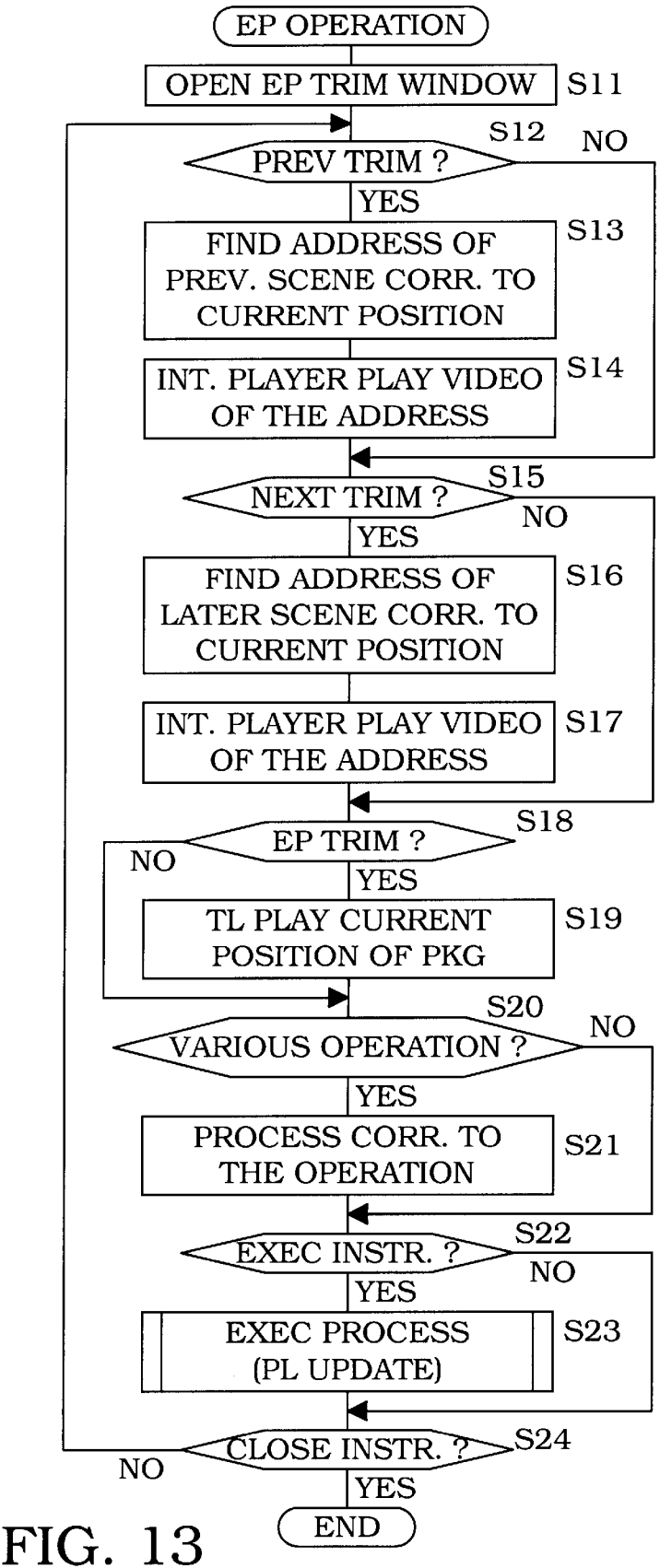
FIG. 13 shows a flow chart of a process step example of the edit point operation process according to an embodiment of the present invention.

FIG. 13 shows process steps of the edit point operation when the edit point trim window is opened according to the present embodiment. The process is activated by pressing the "PREV TRIM", the "EP TRIM" or the "NEXT TRIM" key.

At first, the edit point window is opened as shown in FIG. 12 (S11). Then, if the "PREV TRIM" key is pressed (including the case of being pressed at the time of opening this window) (S12), the system finds the address of the original material of the previous scene corresponding to the current position (S13). The address range of the previous scene on the disk can be determined from the play list, and the IN and OUT points of each scene defined by the play list can be converted into time codes on the time line. Therefore, the address of an arbitrary position within the scene, corresponding to the current position, can be determined. Following that, the internal player (PP) plays the video of the address position (S14).

If the "NEXT TRIM" key is pressed (including the case of being pressed at the time of opening this window) (S15), it similarly finds the address of the original material of the later scene corresponding to the current position (S16). Following that, the internal player (PP) plays the video of the address position (S17).

If the "EP TRIM" key is pressed (including the case of being pressed at the time of opening this window) (S18), the current position of the package is played by the time line (S19). If the user conducts the various operations, such as operating the dial 18A or the value input (S20), the process corresponding to the operation is conducted (S21).

If the EXEC button in the edit point window is pressed, the play list is updated by an execution process described below (S23).

When the user instructs the end (for example, the user presses the CLOSE key in the key group 18H of the operation controller 18), this process is over.

Figure 14:
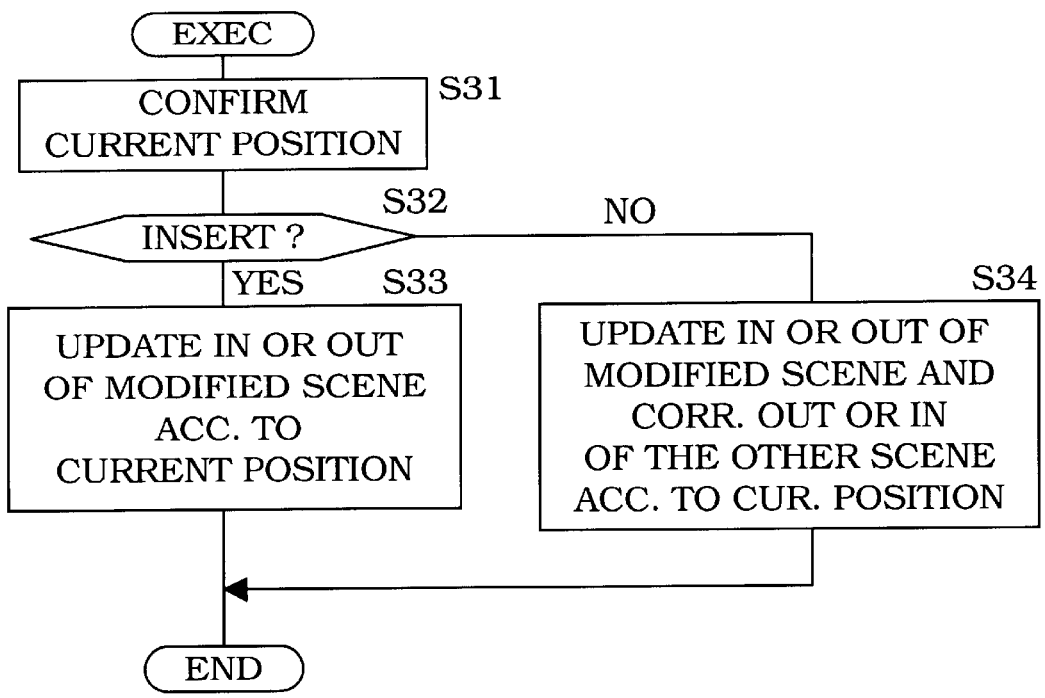
FIG. 14 shows a flow chart of a detailed execution process step example in FIG. 13.

FIG. 14 shows an example of process steps corresponding to the step 23 of FIG. 13. At first, the current position is confirmed (S31), and it judges that which of the edit modes (overwrite or insert) is set at present (S32). If the insert mode is set, the IN point or the OUT point of the modified scene is updated according to the current position (S33). The IN point or the OUT point of the other scene remains as it is. If the overwrite mode is set, the IN point or the OUT point of the modified scene and the corresponding OUT point or the corresponding IN point of the other scene are modified (S34).

Although the invention has been shown and described with using the preferred embodiments, it would be realized for the skilled in the art that the present invention is not limited in the above embodiments and has many other modifications according to the principle.

INDUSTRIAL APPLICABILITY

The present invention is applicable to the manufacturing and the use of a non-linear video edit system. The present invention provides a user with useful operations when an edit point, the border of the cut scenes, is moved. In particular, the user can view the outside (margin) portion of the other scene, which corresponds to the current play position of one scene, by just the key instruction so that the edit operation is simplified and the edit efficiency is improved.

What is claimed is:

1. A non-linear video edit system comprising:
   a nonvolatile random access storage means,
   recording means for recording digitized video data into the random access storage means,
   play list means for creating a play list consisting of data indicating start and end positions of each of plural scenes which are cut from the video stored in the random access storage means,
   a time line play means for playing the plural scenes successively according to the play list,
   a display means for displaying an edit point related window including data concerning adjacent first and second scenes, the edit point related window displaying an edit point at the border of the first and second scenes, and
   a control means for controlling said means wherein the control means displays the edit point related window relating to a selected edit point on the display means according to a user instruction and provides first, second and third play modes which are user-selectable at time of playing the video for edit, and wherein the control means plays the first cut scene before the edit point and the second cut scene after the edit point in the first mode, plays the first cut scene both before and after the edit point in the second mode, and plays the second cut scene both before and after the edit point in the third mode.

2. A non-linear video edit system according to claim 1, wherein, when the user instructs a switch from the first or second play mode to the third play mode during the video of the first cut scene at a position before the edit point, the control means switches to the video play of the outside of the second cut scene at the position corresponding to said position before the edit point on the time line, and when the user instructs a switch from the first or third play mode to the second play mode during the video of the second cut scene at a position after the edit point, the control means switches to the video play of the outside of the first cut scene at the position corresponding to said position after the edit point on the time line.

3. A non-linear video edit system according to claim 1, further comprising a play speed adjustment means for allowing the user to adjust the play speed of the video for the edit.

4. A non-linear video edit system according to claim 1, wherein if the control means receives an instruction from the user to modify the position of the edit point, the control means updates the end position of the first cut scene and the start position of the second cut scene on the play list so that the modified new edit point will be a new border of the first and second cut scenes.

* * * * *